United States Patent [19]

Lipkes

[11] Patent Number: 4,485,958
[45] Date of Patent: Dec. 4, 1984

[54] TOOL FOR REMOVING SOLDERED IC PACKAGES

[75] Inventor: Zeev Lipkes, Solana Beach, Calif.

[73] Assignee: Burroughs Corporation, Detroit, Mich.

[21] Appl. No.: 478,691

[22] Filed: Mar. 25, 1983

[51] Int. Cl.³ .................... B23K 1/00; B23P 19/04
[52] U.S. Cl. ............................... 228/19; 29/764; 228/106; 228/264
[58] Field of Search ............ 29/764, 762, 739, 426.4, 29/426.5; 228/19, 55, 106, 264

[56] References Cited

U.S. PATENT DOCUMENTS

| | | | |
|---|---|---|---|
| 3,632,972 | 1/1972 | Halstead | 228/19 X |
| 3,669,333 | 6/1972 | Coucoulas | 228/106 X |
| 3,746,239 | 7/1976 | Auray | 228/19 |
| 3,990,863 | 11/1976 | Palmer | 228/264 X |

Primary Examiner—Carl E. Hall
Attorney, Agent, or Firm—Charles J. Fassbender; Kevin R. Peterson

[57] ABSTRACT

A tool for removing soldered IC packages comprises a block of heat-conducting material having a plurality of cylinder-shaped holes with parallel axes; a plurality of heat-conducting rods, each of which has one end that slides in a respective one of said holes; an insulator containing the block having a lid with another plurality of holes which are aligned with at least some of the rods in the block; and means for moving the rods that align with the holes in the lid partway through such holes by distances of unequal length so they can conduct heat from the block to respective I/O pins on the package that lie in multiple planes.

12 Claims, 6 Drawing Figures

TOOL FOR REMOVING SOLDERED IC PACKAGES

BACKGROUND OF THE INVENTION

This invention relates to mechanisms for removing integrated circuit packages (IC packages) from a printed circuit board when such devices are soldered to the board.

Typically, between twenty and two hundred integrated circuit packages are soldered to a single board. Thus, when one package fails, it is not economical to simply replace the entire board. Instead, the more common procedure is to remove and replace the failed package on the board.

In the prior art, each integrated circuit package originally had a relatively small number of input/output pins (I/O pins), such as sixteen or twenty-four. Thus, the removal of those chips was a simple task. It was achieved by merely heating the pins one-at-a-time with a soldering iron until the solder melted while simultaneously removing the melted solder with a solder sucker.

To remove the solder from a single pin by the above technique typically takes about twenty seconds. So all of the I/O pins of a sixteen-pin package can be de-soldered in about five minutes.

But with VLSI technology greatly increasing the number of transistors per IC package, there is a need to also greatly increase the number of I/O pins from the package. For example, some recent packages from the assignee of this case have a total of over two hundred pins. Thus the above-described pin-by-pin de-soldering operation is impractical for such packages. At twenty seconds per pin, the de-soldering operation for a two hundred-pin package takes over one hour.

One approach to resolve this problem is to contact the top of a package (rather than the individual pins) with the soldering iron. Then heat is transmitted by conduction from the top of the package through electrical conductors in the package to the I/O pins. However, the conductors in a package are very narrow (e.g., typically less than four mils). Thus, heat conduction from the top of a package to the pins is very poor. Instead, much of the heat from the soldering iron is conducted through the package to its bottom which lies in close proximity to the printed circuit board. From there, the heat is transmitted by convection to the printed circuit board where it can cause damage.

Another approach to resolve the above problem is to provide a solder fountain from which molten solder flows. This flowing solder has a surface area which is slightly larger than the area of the integrated circuit package that is to be removed from the printed circuit board. In operation, the tips of the I/O pins that protrude through the board are placed in the fountain whereupon they heat-up and melt the solder which holds them to the board.

However, all of the I/O pins of an integrated circuit package do not protrude through the printed circuit board by the same distance. This is because the I/O pins are cut at random lengths after they are soldered to the board. Consequently, the solder fountain must be placed very close to the printed circuit board so that the molten solder will contact all of the pins including those of the shortest length. But since the solder fountain and printed circuit board are so close, solder from the fountain can splatter onto the printed circuit board; and this in turn can damage the board.

Further, the cross-sectional area of the tips of the I/O pins is only a small fraction of the area of an integrated circuit package. This is because the I/O pins have spaces between them; and often the pins only border the perimeter of the package. Thus, most of the heat from the solder fountain is not transmitted by conduction to the I/O pins; but instead, most of the heat is transmitted by convection to the printed circuit board beneath the package. This again can cause electrical and mechanical damage to the board.

Accordingly, a primary object of the invention is to provide an improved tool for removing integrated circuit packages, having a large number of I/O pins, that are soldered to a printed circuit board.

BRIEF SUMMARY OF THE INVENTION

In one embodiment of the invention, the above object and others are achieved by a tool comprising: a block of heat-conducting material having a plurality of cylinder-shaped holes with axes that are perpendicular to one surface of the block; a plurality of springs, each of which is disposed in a respective one of the holes to compress and expand in the direction of the axes; a plurality of heat-conducting rods, each of which has one end that slides in a respective one of the holes parallel to the axes in response to the compressive force of the spring which lies therein; an insulating container enclosing the block having a lid that is parallel to and spaced apart from the one surface of the block, the lid having a plurality of holes that are patterned the same as the I/O pins on the integrated circuit package that is to be de-soldered from a printed circuit board; the rods being shaped such that the ends opposite to the one end move through the holes in the lid by distances that vary according to the degree by which the springs are compressed, so that the rods can contact all of the I/O pins in spite of the unequal distances by which they protrude through the printed circuit board.

BRIEF DESCRIPTION OF THE DRAWINGS

Various features and advantages of the invention are described in the Detailed Description in conjunction with the accompanying drawings wherein.

DETAILED DESCRIPTION OF THE INVENTION

Figure 1:
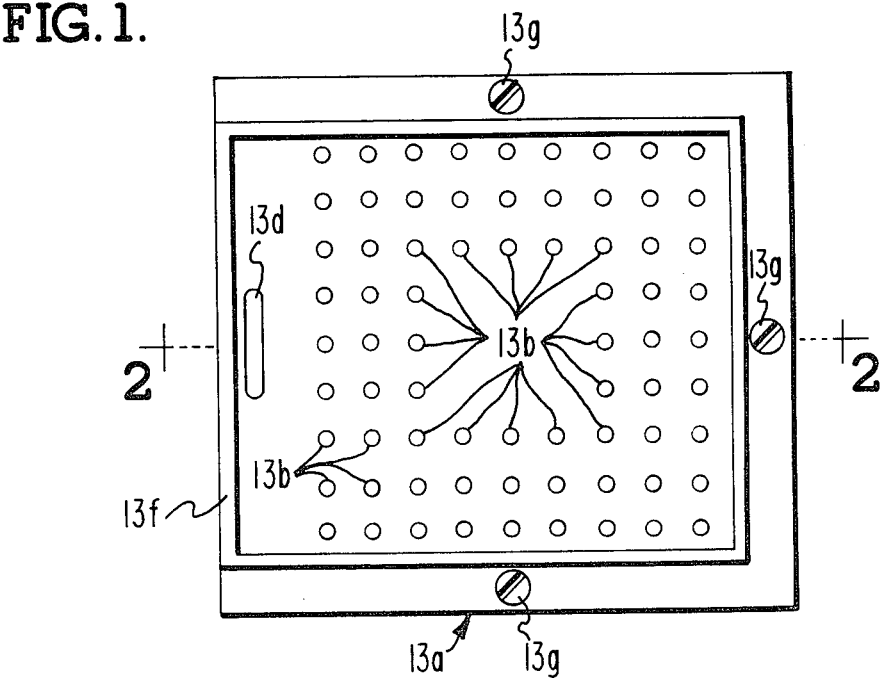
FIG. 1 is a greatly enlarged top view of one preferred embodiment of the invention.

Several preferred embodiments of the invention will now be described in detail beginning with the embodiment of FIGS. 1 and 2. This embodiment includes a block 10 of heat-conducting material having a surface 10a with a plurality of cylinder-shaped holes 10b. Each hole 10b has a central axis which is perpendicular to surface 10a; and the axes are spaced apart by the same distance as the I/O pins on the integrated circuit package that is to be removed from a printed circuit board.

Disposed in each of the holes 10b is a helical spring 11. Each spring is oriented such that it can compress and expand in the direction of the hole's axis. Also, disposed in each of the holes 10b on top of the spring 11 is one end of a rod 12. Each rod 12 is oriented such that it can move in the direction of the hole's axis in response to the compressive force in the spring 11 on which it rests.

An insulating container 13 encloses block 10; and container 13 includes a lid 13a which is spaced apart from and parallel to surface 10a of block 10. Lid 13a has a set of holes 13b which align with a preselected subset of the holes 10b in block 10. In other words, the lid-holes 13b align with a preselected subset of the rods 12 to thereby allow the ends of such rods to protrude through the lid-holes while the remaining rods are blocked by the lid.

Figure 2:
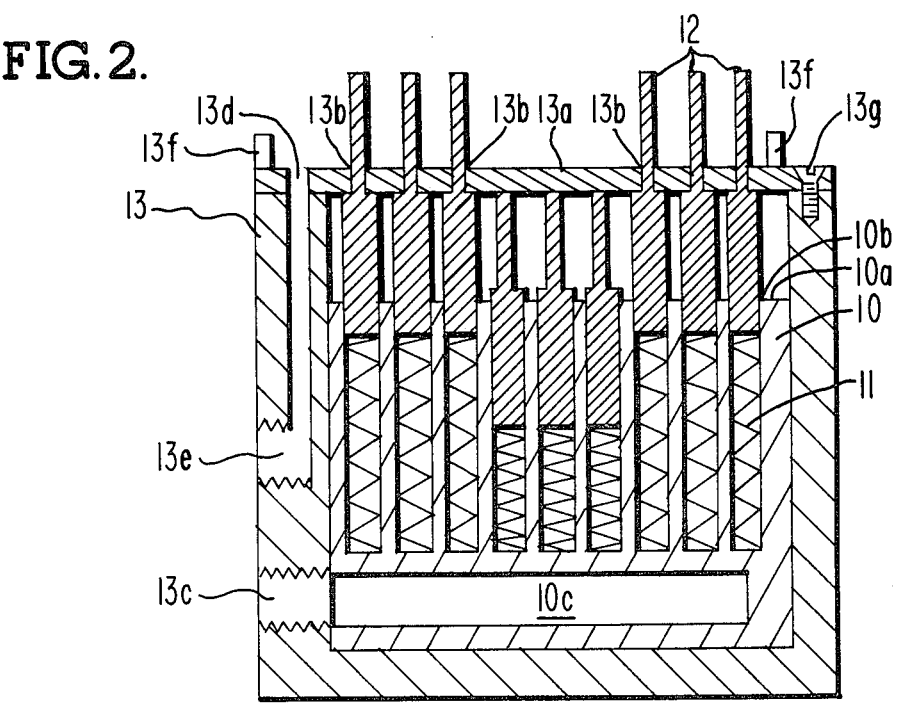
FIG. 2 is a greatly enlarged cross-sectional view of the FIG. 1 embodiment taken along lines 2—2.

In the FIG. 1 and 2 embodiments, the lid-holes 13b are smaller in diameter than the block-holes 10b. Also, the ends of the rods 12 which fit through the lid-holes 13b have a diameter which is only slightly smaller than those holes; while the ends of the rods 12 which fit into the block-holes 10b have a diameter which is only slightly smaller than those holes. Consequently, the compressive forces in the springs 11 can push the rods 12 only partway through the lid holes 13b.

Suitably, block 10 as well as the rods 12 are made of copper, aluminum, or recrystalized graphite since each of those materials has a thermal conductivity of well over one hundred BTU/hour-foot-°F. Also suitably, container 13 and lid 13a are made of silicon nitride, ceramic fibers, or glass fibers since each of those materials has a thermal conductivity of less than one BTU/hour-foot-°F.

Further, suitable dimensions for the above-described components are as follows: 0.075 inches for the diameter of the lid holes 13b and the portion of the rods 12 which protrude through those holes; 0.100 inches for the diameter of the block holes 10b and the portion of the rods 12 which slide in those holes; and 2.00 inches for the length, width, and height of container 13.

Both the total number of lid-holes 13b and their pattern are made to correspond to the pins of the integrated circuit package that is to be removed from the printed circuit board. Preferably, the total number of lid-holes 13b is at least fifty. In the embodiment of FIGS. 1 and 2, the lid-holes 13b form the sides of a rectangular pattern; and the total number of holes is seventy-two. However, in other similarly shaped and larger patterns, the total number of lid-holes 13b can exceed two hundred.

Figure 3:
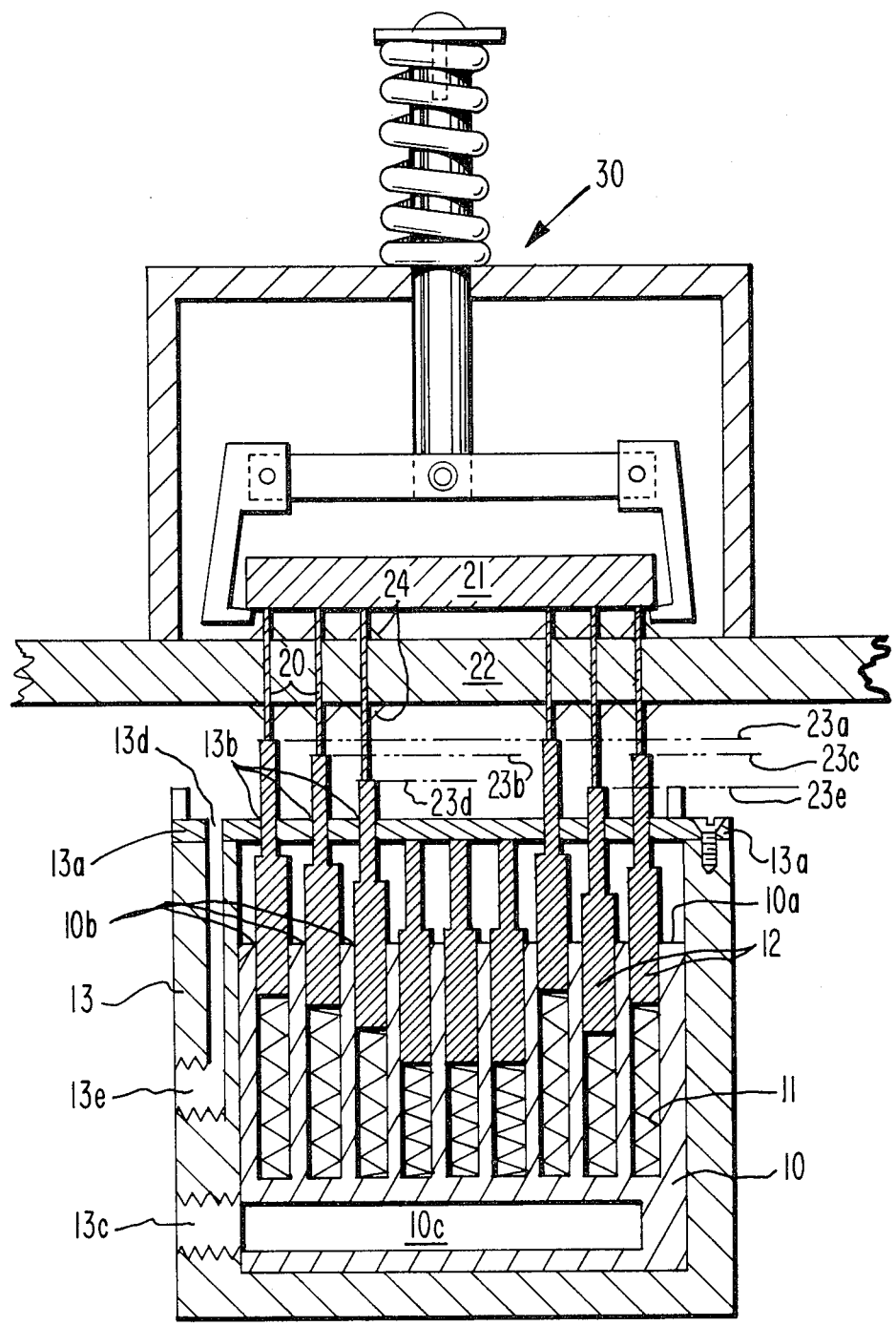
FIG. 3 illustrates the operation of the embodiment of FIGS. 1 and 2.

FIG. 3 illustrates the process by which the tool of FIGS. 1 and 2 is used. To begin, an external heat source (not shown) is inserted through an aligned pair of holes 10c and 13c which are respectively provided in block 10 and container 13. Suitably, this heat source can be an electric radiator.

Heat from the heat source is conducted through the block 10 and springs 11 to the rods 12. Those rods which protrude through the lid-holes 13b make contact at their ends with the I/O pins 20 of the integrated circuit package 21 that is to be removed from the printed circuit board 22.

Such contact is made even though the I/O pins 20 pass through board 22 by different lengths which cause their tips to lie in different planes 23a-23e. This is so because the rods 12 are free to move in the block-holes 10b against the springs 11.

Due to the contact between the rods 12 and the I/O pins 20, most of the heat in the rods is transferred by conduction to the pins which causes the surrounding solder 24 to melt. On the other hand, only a relatively small amount of heat is transferred by convection from the rods to board 22.

Preferably, lid 13a has a hole 13d that aligns with another hole 13e in a sidewall of container 13 to which an external vacuum source (not shown) can be connected. Thus, a vacuum is created in the space between lid 13a and board 22 which sucks the melted solder away from the pins 20. A flexible gasket 13f can also be attached to the top of lid 13a to contain the solder and direct the vacuum toward the pins 20.

While heat is being applied by the rods 12 to the I/O pins 20, a force is applied to the integrated circuit package 21 to remove that package from board 22 as soon as the solder 24 melts. Such force can be applied manually; or alternatively, the force can be applied mechanically by an apparatus 30 as illustrated.

Figure 4:
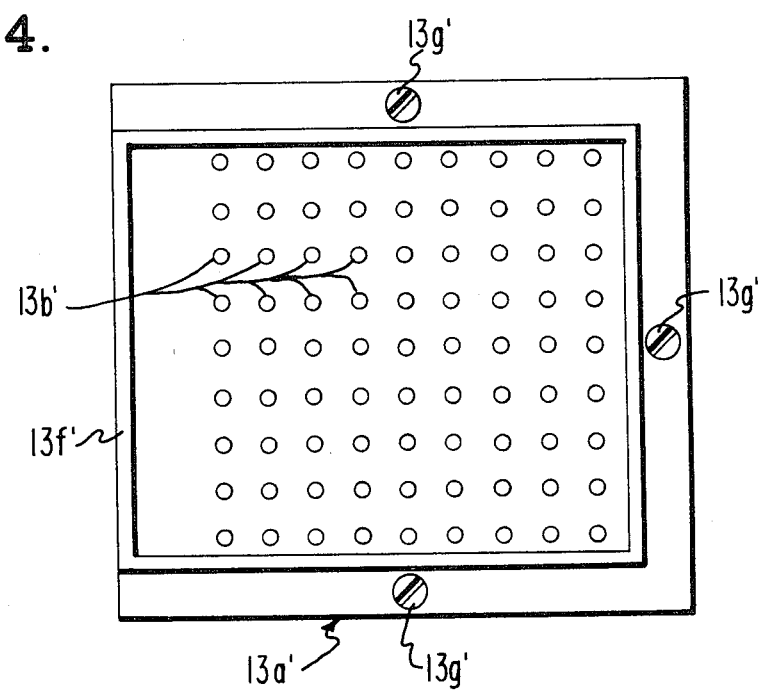
FIG. 4 is a greatly enlarged top view of another lid for the FIG. 1 embodiment.

Preferably, lid 13a is attached to container 13 in an easily replaceable fashion. For example, three screws 13g are provided as illustrated in FIGS. 2 and 3. This allows lid 13a to be removed and replaced with another lid 13a' having a different set of holes 13b' which match the I/O pins of another integrated circuit package. FIG. 4 illustrates one such lid 13a' having a rectangular pattern of holes 13b' with no holes being eliminated from the central portion of the pattern.

Figure 5:
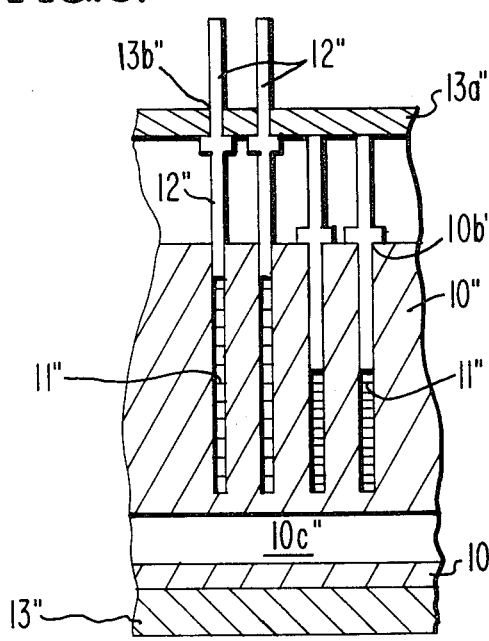
FIGS. 5 and 6 are cross-sectional views of other embodiments of the invention.
Figure 6:
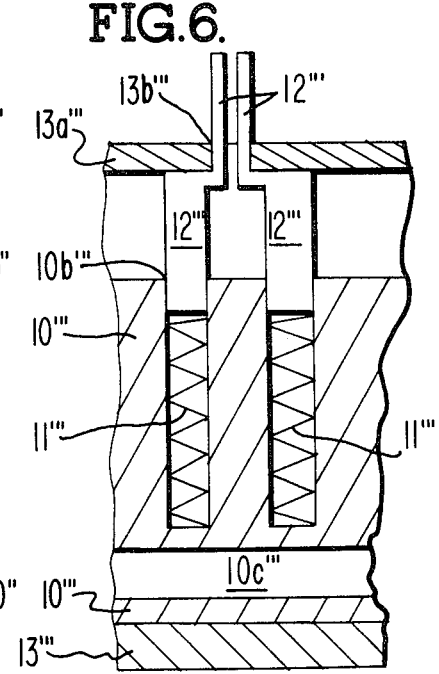

Referring next to FIGS. 5 and 6, two other alternative embodiments will be described. These embodiments are similar to the embodiment of FIG. 2; and like parts are identified by like reference numerals with a "double prime" being appended in FIG. 5 and a "triple prime" being appended in FIG. 6.

A major change in the FIG. 5 embodiment in comparison to FIG. 2 is that the rods 12" are somewhat different in shape. In particular, the rods 12" have the same diameter at both of their ends; and they also have a center ring 12a" that is wider than the ends. Portion 12a" prevents the springs 11" from pushing the rods 12" completely through lid 13a". Also in this embodiment, the holes 10b" in block 10" are narrower in diameter to correspond to the above-described shape of the rods 12".

Similarly, a major change in the FIG. 6 embodiment in comparison to FIG. 2 is that the rods 12''' are also different in shape. In particular, the rods 12''' are not straight; but instead, they are bent such that the ends which fit into the block-holes 10b''' are spaced relatively far apart; whereas the ends which fit through the lid-holes 13b''' are much closer together. In other words, in this embodiment the central axes of the block-holes are not constrained to line up with the I/O pins on the package that is to be removed. This embodiment is particularly suited for removing integrated circuit packages having I/O pins that are extremely close together.

Various preferred embodiments of the invention have now been described in detail. In addition, however, many changes and modifications can be made to these embodiments without departing from the nature and spirit of the invention. Accordingly, it is to be understood that the invention is not limited to such details but is defined by the appended claims.

What is claimed is:

1. A tool for removing an integrated circuit package from a printed circuit board when said package has a plurality of I/O pins that protrude by unequal distances through via holes in said board and are soldered thereto; said tool comprising:
- a block of heat-conducting material having a plurality of cylinder-shaped holes with axes that are perpendicular to one surface of said block;
- a plurality of springs, each of which is disposed in a respective one of said holes to compress and expand in the direction of said axes;
- a plurality of heat-conducting rods, each of which has one end that slides in a respective one of said holes parallel to said axes in response to the compressive force of the spring which lies therein;
- an insulating container enclosing said block having a lid that is parallel to and spaced apart from said one surface of said block, said lid having a plurality of holes that are patterned the same as the I/O pins on said package;
- said rods being shaped such that the ends opposite to said one end move through the holes in said lid by distances that vary according to the degree by which said springs are compressed, so that said rods can contact all of said I/O pins in spite of the unequal distances by which they protrude through said board.

2. A tool according to claim 1 wherein the number of holes in said lid is less than the number of rods in said block so that only a preselected subset of said rods move through said lid while the remaining rods are blocked by said lid.

3. A tool according to claim 1 wherein said lid is secured to said container in a replaceable fashion, and further including another lid having a unique pattern of holes which corresponds to the I/O pins on another integrated circuit package.

4. A tool according to claim 1 wherein each of said rods is shaped such that said one end is wider than said opposite end, and said holes in said lid are wide enough to pass said opposite end but not said one end.

5. A tool according to claim 1 wherein each of said rods is shaped such that said one end is the same width as said opposite end, and a ring is disposed between said ends which ring is wider than said ends, and said holes in said lid are wide enough to pass said ends but not said ring.

6. A tool according to claim 1 wherein said lid has an additional hole; and said container has a passageway to said additional hole so that a vacuum can be applied to said passageway to remove solder through said additional hole as the solder melts from said pins.

7. A tool according to claim 1 wherein said rods are straight, and the axes of said holes in said block align with the holes in said lid.

8. A tool according to claim 1 wherein the axes of said holes in said block are spaced apart farther than the holes in said lid, and said rods are shaped to accomodate this difference in spacing.

9. A tool according to claim 1 wherein said springs are helical springs.

10. A tool according to claim 1 wherein the number of said heat-conducting rods is at least fifty.

11. A tool according to claim 1 wherein the holes in said lid through which said rods move are arranged in a rectangular pattern with no holes in the central portion of said pattern.

12. A tool comprising a block of heat-conducting material having a plurality of cylinder-shaped holes with parallel axes; a plurality of heat-conducting rods, each of which has one end that slides in a respective one of said holes; an insulator containing said block having a lid with another plurality of holes which are aligned with at least some of the rods in said block; and means for moving said rods that align with the holes in said lid partway through such holes by distances of unequal length so they can conduct heat from said block to respective points that lie in more than one plane.

* * * * *